(12) United States Patent
Patil et al.

(10) Patent No.: US 9,992,032 B2
(45) Date of Patent: Jun. 5, 2018

(54) METHOD AND SYSTEM FOR MANAGING TELEPHONY SERVICES IN A UNIVERSAL PLUG AND PLAY HOME NETWORK ENVIRONMENT

(75) Inventors: Mayuresh Madhukar Patil, Bangalore (IN); Basavaraj Jayawant Pattan, Bangalore (IN)

(73) Assignee: Samsung Electronics Co., Ltd (KR)

( * ) Notice: Subject to any disclaimer, the term of this patent is extended or adjusted under 35 U.S.C. 154(b) by 242 days.

(21) Appl. No.: 14/117,266

(22) PCT Filed: May 9, 2012

(86) PCT No.: PCT/KR2012/003648
§ 371 (c)(1),
(2), (4) Date: Nov. 12, 2013

(87) PCT Pub. No.: WO2012/153982
PCT Pub. Date: Nov. 15, 2012

(65) Prior Publication Data
US 2015/0023344 A1    Jan. 22, 2015

(30) Foreign Application Priority Data
May 9, 2011    (IN) .......................... 1607/CHE/2011

(51) Int. Cl.
*H04L 12/16*    (2006.01)
*H04L 12/12*    (2006.01)
(Continued)

(52) U.S. Cl.
CPC .............. *H04L 12/16* (2013.01); *H04L 12/12* (2013.01); *H04L 12/2807* (2013.01);
(Continued)

(58) Field of Classification Search
CPC ..... H04L 47/10; H04L 43/50; H04L 12/2697; H04L 43/0852; H04L 43/00
(Continued)

(56) References Cited

U.S. PATENT DOCUMENTS 6,498,797 B1 * 12/2002 Anerousis ......... H04M 3/42229
370/252
7,184,428 B1 * 2/2007 Gerszberg ........... H04L 12/2856
370/352
(Continued)

FOREIGN PATENT DOCUMENTS

| CN | 1428034 | 7/2003 |
| EP | 2 131 553 | 12/2009 |
| KR | 1020080113080 | 12/2008 |

OTHER PUBLICATIONS

Chinese Office Action dated Jan. 28, 2016 issued in counterpart application No. 201280028374.3, 18 pages.
(Continued)

*Primary Examiner* — Mark Rinehart
*Assistant Examiner* — Sanjay K Dewan
(74) *Attorney, Agent, or Firm* — The Farrell Law Firm, P.C.

(57) ABSTRACT

The present invention provides a method and system for managing telephony services in a Universal Plug and Play (UPnP) home network environment. In one embodiment, a method includes creating one or more profiles associated with at least one Telephony Control Point (TelCP) in an UPnP home network environment, each of the one or more profiles includes one or more service settings associated with telephony services. The method also includes storing the one or more profiles associated with the at least one TelCP in a service settings database. Additionally, the method includes setting one of the one or more profiles as an active profile for the at least one TelCP, and providing
(Continued)

telephony services to the at least one TelCP according to the one or more service settings associated with the active profile.

16 Claims, 12 Drawing Sheets

(51) Int. Cl.
  *H04L 12/24* (2006.01)
  *H04L 12/28* (2006.01)
  *H04L 29/08* (2006.01)

(52) U.S. Cl.
  CPC ...... *H04L 12/2814* (2013.01); *H04L 41/0809* (2013.01); *H04L 67/303* (2013.01)

(58) Field of Classification Search
  USPC .................................................. 370/252
  See application file for complete search history.

(56) References Cited

U.S. PATENT DOCUMENTS

| | | | | |
|---|---|---|---|---|
| 7,197,011 | B2* | 3/2007 | Fong | H04L 12/2803 370/252 |
| 7,620,058 | B2* | 11/2009 | Gorti | H04L 12/2814 370/352 |
| 7,715,325 | B2* | 5/2010 | Lee | H04L 12/2602 370/252 |
| 7,729,282 | B2* | 6/2010 | Lee | H04L 12/2602 370/252 |
| 7,778,193 | B2* | 8/2010 | Mizuno | H04L 12/281 370/252 |
| 8,069,143 | B2* | 11/2011 | Swanburg | H04L 29/12047 707/610 |
| 8,189,489 | B2* | 5/2012 | Zhang | H04L 12/2602 370/248 |
| 8,265,622 | B2* | 9/2012 | Zhu | H04L 67/303 370/352 |
| 8,284,659 | B2* | 10/2012 | Kitani | H04L 47/10 370/230 |
| 8,311,037 | B2* | 11/2012 | Yang | H04L 65/1016 370/352 |
| 8,406,733 | B2* | 3/2013 | Raleigh | G06Q 10/06375 455/407 |
| 8,908,678 | B1* | 12/2014 | McGonigal | H04W 28/0268 370/352 |
| 9,413,882 | B2* | 8/2016 | Gisby | H04K 1/00 |
| 2002/0083143 | A1* | 6/2002 | Cheng | H04L 12/2805 709/208 |
| 2003/0058841 | A1* | 3/2003 | Lin | H04L 12/10 370/352 |
| 2003/0067554 | A1* | 4/2003 | Klarfeld | G11B 27/105 348/461 |
| 2006/0031887 | A1* | 2/2006 | Sparrell | H04L 12/2821 725/78 |
| 2006/0268839 | A1* | 11/2006 | Kato | H04L 29/06027 370/352 |
| 2007/0226346 | A1 | 9/2007 | Hyvarinen et al. | |
| 2008/0159162 | A1* | 7/2008 | Morikuni et al. | 370/252 |
| 2008/0209034 | A1* | 8/2008 | Shin | H04L 12/2807 709/224 |
| 2009/0147772 | A1* | 6/2009 | Rao | H04L 12/1818 370/352 |
| 2009/0248788 | A1* | 10/2009 | Hinds | H04L 12/2834 709/202 |
| 2010/0040211 | A1 | 2/2010 | Maeng et al. | |
| 2010/0067444 | A1* | 3/2010 | Faccin | H04W 4/22 370/328 |
| 2010/0098057 | A1* | 4/2010 | Stewart | H04M 3/46 370/352 |
| 2010/0159898 | A1* | 6/2010 | Krzyzanowski | G06F 9/4445 455/414.1 |
| 2010/0180019 | A1* | 7/2010 | Elston et al. | 709/222 |
| 2010/0182997 | A1* | 7/2010 | Yang | H04L 65/1016 370/352 |
| 2010/0188975 | A1* | 7/2010 | Raleigh | G06Q 10/06375 370/230.1 |
| 2010/0211636 | A1* | 8/2010 | Starkenburg | H04N 7/17318 709/203 |
| 2010/0262467 | A1* | 10/2010 | Barnhill et al. | 705/10 |
| 2010/0284398 | A1* | 11/2010 | Maeng | H04L 12/2838 370/352 |
| 2011/0029653 | A1* | 2/2011 | Stein | H04L 12/2801 709/223 |
| 2011/0085648 | A1* | 4/2011 | Maeng et al. | 379/93.14 |
| 2011/0107364 | A1* | 5/2011 | Lajoie | H04L 65/1016 725/25 |
| 2011/0116419 | A1* | 5/2011 | Cholas | H04M 3/533 370/259 |
| 2011/0188410 | A1* | 8/2011 | Levin | H04L 12/16 370/259 |
| 2012/0182987 | A1* | 7/2012 | Gallant | H04L 12/14 370/352 |
| 2012/0189000 | A1* | 7/2012 | Rahman | H04L 63/08 370/352 |
| 2014/0036733 | A1* | 2/2014 | Teng | G06Q 10/109 370/260 |
| 2014/0162556 | A1* | 6/2014 | Dua | G06F 17/30058 455/41.2 |
| 2014/0362719 | A1* | 12/2014 | May | H04L 63/1408 370/252 |
| 2015/0022624 | A1* | 1/2015 | Tighe | H04L 12/1822 348/14.08 |

OTHER PUBLICATIONS

European Search Report dated Dec. 17, 2014 issued in counterpart application No. 12781838.3-1862.
PCT/ISA/237 Written Opinion issued on PCT/KR2012/003648 (pp. 4).
PCT/ISA/210 Search Report issued on PCT/KR2012/003648 (pp. 3).
Mahfuzur Rahman et al., "TelephonyArchitecture:1", for UPnP Version 1.0, Standardized DCP (SDCP), Mar. 22, 2011, 24 pages.
Korean Office Action dated Feb. 13, 2018 issued in counterpart application No. 10-2013-7032595, 11 pages.

* cited by examiner

METHOD AND SYSTEM FOR MANAGING TELEPHONY SERVICES IN A UNIVERSAL PLUG AND PLAY HOME NETWORK ENVIRONMENT

PRIORITY

This application is a National Phase Entry of PCT International Application No. PCT/KR2012/003648, which was filed on May 9, 2012, and claims priority to Indian Patent Application No. 1607/CHE/2011, which was filed on May 9, 2011, the contents of which are incorporated herein by reference.

Background

1. Field of the Disclosure

The present invention relates to the field of universal plug and play (UPnP) system, and more particularly relates to managing telephony services to Telephony Control Point (TelCP) in a UPnP home network environment.

2. Description of the Related Art

Universal Plug and Play (UPnP) is a set of computer network protocols promulgated by the UPnP forum. The goals of UPnP are to allow access to connect seamlessly and to simplify implementation of networks in home (e.g., data sharing, communications, and entertainment) and corporate environments. These goals are achieved by defining and publishing UPnP device control protocols built upon open, Internet-based communication standards.

The UPnP technology can cater to a wide range of devices in a home network. The UPnP technology provides discovery, control and eventing mechanisms. Using these mechanisms, UPnP makes availability and unavailability of the UPnP devices on the fly to the other devices in the UPnP home network.

UPnP architecture allows peer-to-peer networking of personal computers (PCs), networked appliances, and wireless devices. It is distributed, open architecture based on established standards such as transport control protocol/Internet protocol (TCP/IP), user datagram protocol (UDP), hypertext transfer protocol (HTTP) and extended mark-up language (XML). The UPnP architecture supports zero configuration networking. For example, an UPnP compatible device from any vendor can dynamically join a network, obtain an Internet Protocol (IP) address, announce its name, convey its capabilities upon request, and learn about the presence and capabilities of other devices. On the other hand, the UPnP devices can leave the UPnP home network automatically without leaving any unwanted state information.

The foundation for UPnP networking is Internet Protocol (IP) addressing. Each UPnP device includes a dynamic host configuration protocol (DHCP) client which searches for a DHCP server when the UPnP device is first connected to the UPnP network. If no DHCP server is available, the UPnP device assigns itself an IP address. If during the DHCP transaction, the UPnP device obtains a domain name, for example, through a domain name system (DNS) server or via DNS forwarding, the UPnP device uses that name in subsequent network operations otherwise the UPnP device uses its IP address.

The UPnP forum also provides telephony services for extending user experience in a home to access telephony services like messaging service, presence service, and call handling (PS/CS call) service. As analogous to UPnP DA, the UPnP telephony defines three kinds of devices, viz. a telephony server (TS) that provides messaging, and presence related services to the user, a telephony control point (TelCP) to initiate actions provided by the TS and a telephony client device (TC) for media related handling and providing input and output to/from the TS.

UPnP telephony has defined an interface which allows telephony user to access telephony services using non-telephony devices. Currently, the telephony user cannot manage the telephony services that are being delivered on non-telephony devices based on preferences of the telephony user. This may lead to poor user experience of the telephony user.

SUMMARY

A method of a telephony server (TS) for providing telephony services in an Universal Plug and Play (UPnP) home network environment, comprising: creating one or more profiles associated with at least one Telephony Control Point (TelCP) in an UPnP home network environment, each of the one or more profiles comprises one or more service settings associated with telephony services; storing the one or more profiles associated with the at least one TelCP in a service settings database setting one of the one or more profiles as an active profile for the at least one TelCP and providing telephony services to the at least one TelCP according to the one or more service settings associated with the active profile.

The present invention provides An apparatus comprising: a processor; and memory coupled to the processor, wherein the memory includes telephony services management module configured for: creating one or more profiles associated with at least one Telephony Control Point (TelCP) in an UPnP home network environment, each of the one or more profiles comprises one or more service settings associated with telephony services; storing the one or more profiles associated with the at least one TelCP in a service settings database; setting one of the one or more profiles as an active profile for the at least one TelCP; and providing telephony services to the at least one TelCP according to the one or more service settings associated with the active profile.

The present invention provides A system comprising: at least one Telephony Control Point (TelCP); a Telephony Server (TS) connected to the at least on TelCP; and a WAN server connected to the TS, wherein the at least one TelCP is configured for receiving a request containing one or more service settings for creating a profile from the at least one TelCP, and wherein the TS is configured for creating one or more profiles associated with the at least one TelCP in an Universal Plug and Play (UPnP) home network environment based on the one or more service settings associated with telephony services, and wherein the TS is configured for setting one of the one or more profiles as an active profile for the at least one TelCP, and wherein the TS is configured for communicating the one or more service settings corresponding to the said active profile to the WAN server, and wherein the WAN server is configured for providing telephony services to the at least one TelCP via the TS according to the one or more service settings associated with the active profile.

The present invention provides A method of a telephony server for controlling telephony services in an Universal Plug and Play (UPnP) home network environment, comprising: creating one or more profiles associated with a telephony user, each of the one or more profiles comprises home settings associated with the telephony user, storing the one or more profiles associated with the telephony user in a home settings database, setting one of the one or more profiles as an active profile for the telephony user; and controlling delivery of the telephony service on one or more Telephony Control Point (TelCPs) associated with the telephony user according to the home settings in the active profile.

The present invention provides An apparatus comprising: a processor; and memory coupled to the processor, wherein the memory includes a telephony services module configured for: creating one or more profiles associated with a telephony user, each of the one or more profiles comprises home settings associated with the telephony user; storing the one or more profiles associated with the telephony user in a home settings database; setting one of the one or more profiles as an active profile for the telephony user; and controlling delivery of the telephony service on one or more Telephony Control Point (TelCPs) associated with the telephony user according to the home settings in the active profile.

The present invention provides A system comprising: one or more telephony control points (TelCPs); and a telephony server (TS) coupled to the one or more TelCPs, wherein the one or more TelCPs are configured for sending a request containing home settings for creating a profile to the TS, and wherein the TS is configured for creating one or more profiles associated with a telephony user, each of the one or more profiles comprises home settings associated with the telephony user, and wherein the TS is configured for setting one of the one or more profiles as an active profile for the telephony user, and wherein the TS is configured for controlling delivery of the telephony service on one or more Telephony Control Point (TelCPs) associated with the telephony user according to the home settings in the active profile.

The drawings described herein are for illustration purposes only and are not intended to limit the scope of the present disclosure in any way.

DETAILED DESCRIPTION OF EMBODIMENTS OF THE PRESENT DISCLOSURE

The present invention provides a method and system for managing telephony services in an Universal Plug and Play (UPnP) home network environment. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
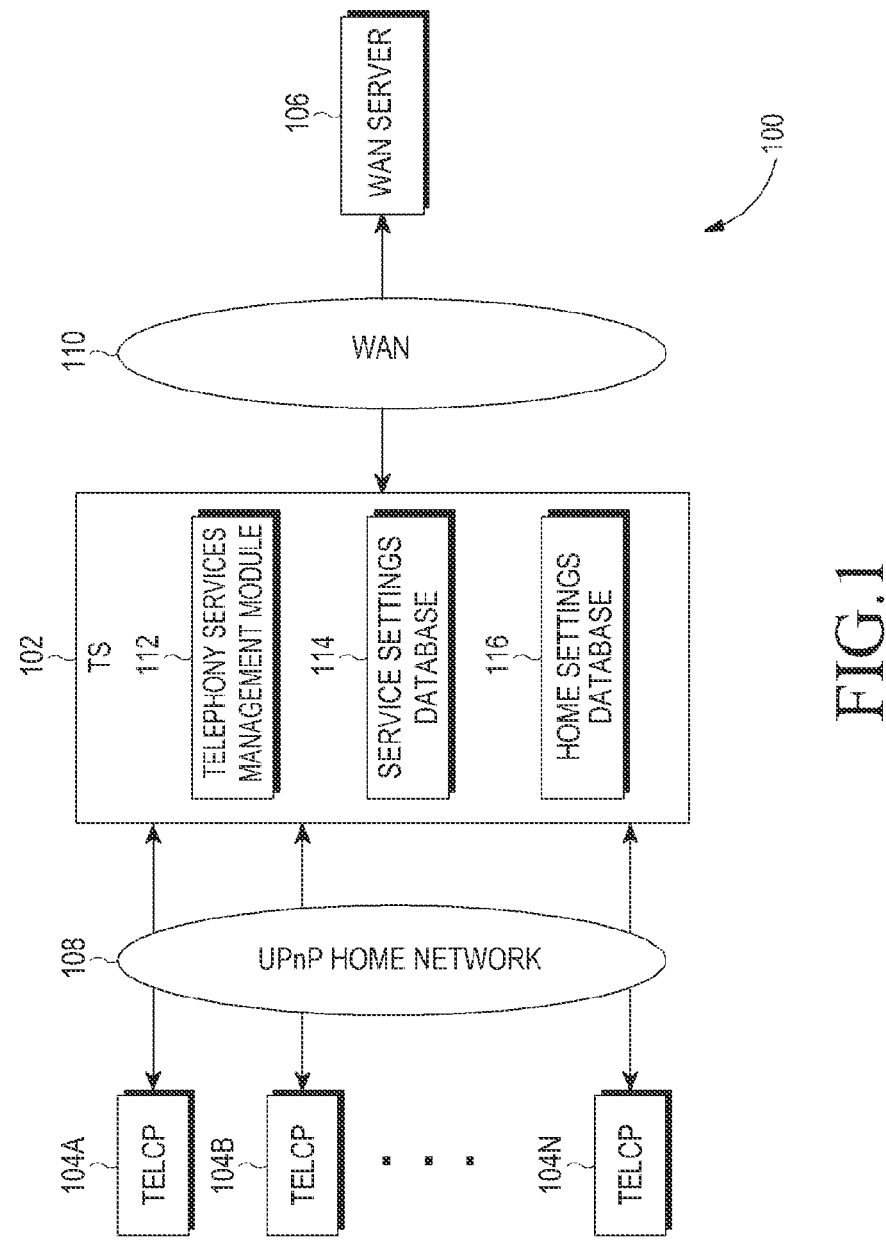
FIG. 1 illustrates a block diagram of an exemplary system for managing telephony services in an Universal Plug and Play (UPnP) home network environment, according to one embodiment.

FIG. 1 illustrates a block diagram of an exemplary system 100 for managing telephony services in an UPnP home network environment, according to one embodiment. In FIG. 1, the system 100 includes a telephony server (TS) 102, telephony control points (TelCPs) 104A-N and a Wireless Area Network (WAN) server 106. The TelCPs 104A-N are connected to the TS 102 via an UPnP network 108 while the TS 102 is connected to the WAN server 106 via a WAN 110.

The TS 102 may be smart phone, personal digital assistant, tablet and the like devices. The TelCPs 104A-N may be telephony devices such as personal computer and non-telephony devices such as Television. The WAN server 106 may be an application server enabling the TS 102 to access telephony services via the WAN 110.

According to the present invention, the TS 102 includes a telephony service management module 112, a service settings database 114, and a home settings database 116. In one embodiment, the telephony service management module 112 maintains profiles containing service settings associated with each of the TelCPs 104A-N in the service delivery setting database 114. Exemplary service settings may include call service settings (e.g., media type settings), presence service setting, message service settings (e.g., MMS message settings, Instant Message settings, message delivery report, network storage, etc.) and the like.

The telephony service management module 112 activates one of the profiles as an active profile for each of the TelCPs 104A-N by applying respective service settings corresponding to the active profile. For example, the telephony service management module 112 sets one of the profiles as active profile based on selection made by user of a respective TelCP. When the active profile is set, the telephony service management module 112 sends associated service settings to the WAN server 106 via the WAN so that the WAN server 106 applies the service settings corresponding to the active profile. Accordingly, the WAN server 106 provides telephony services to the TelCPs 104A-N via the TS 102 according to the service settings in the associated active profile. Consider that, in a profile 'BUSY' associated with the TelCP 104A, history recording is disabled, message delivery status is set as offline and deferred messaging mode is set as 'push'. In such case, the messaging service is delivered on the TelCP 104A according to the settings indicated in the profile 'Busy' when the profile 'BUSY' is set as active profile.

In another embodiment, the telephony service management module 112 maintains profiles containing home settings associated with telephony services inside home. For example, the set of preference may include controlling telephony events (e.g., calls, messages, etc.) only from a particular TelCP, receiving notification only on specific TelCP, blocking incoming telephony events when user is busy, etc. The telephony service management module 112 activates one of the profiles associated with the telephony user as an active profile based on selection by the telephony user.

Accordingly, the telephony service management module 112 controls delivery of telephony services to the telephony user based on the user preferences set in the active profile. For example, consider that telephony user is watching a movie on a TelCP 104A (e.g., television set) and does not want any telephony service to be delivered on any of the TelCPs 104A-N. In such case, the telephony user selects an active profile as 'BUSY' with user preference 'block all incoming telephony services'. Accordingly, the telephony service management module 112 activates the profile 'BUSY' as active profile for the telephony user. Thus, the telephony service management module 112 blocks all incoming telephony events (call, message, etc.) while the profile 'BUSY' is active and notifies other TelCPs 104B-N associated with the telephony user regarding the blocked telephony events.

Figure 2:
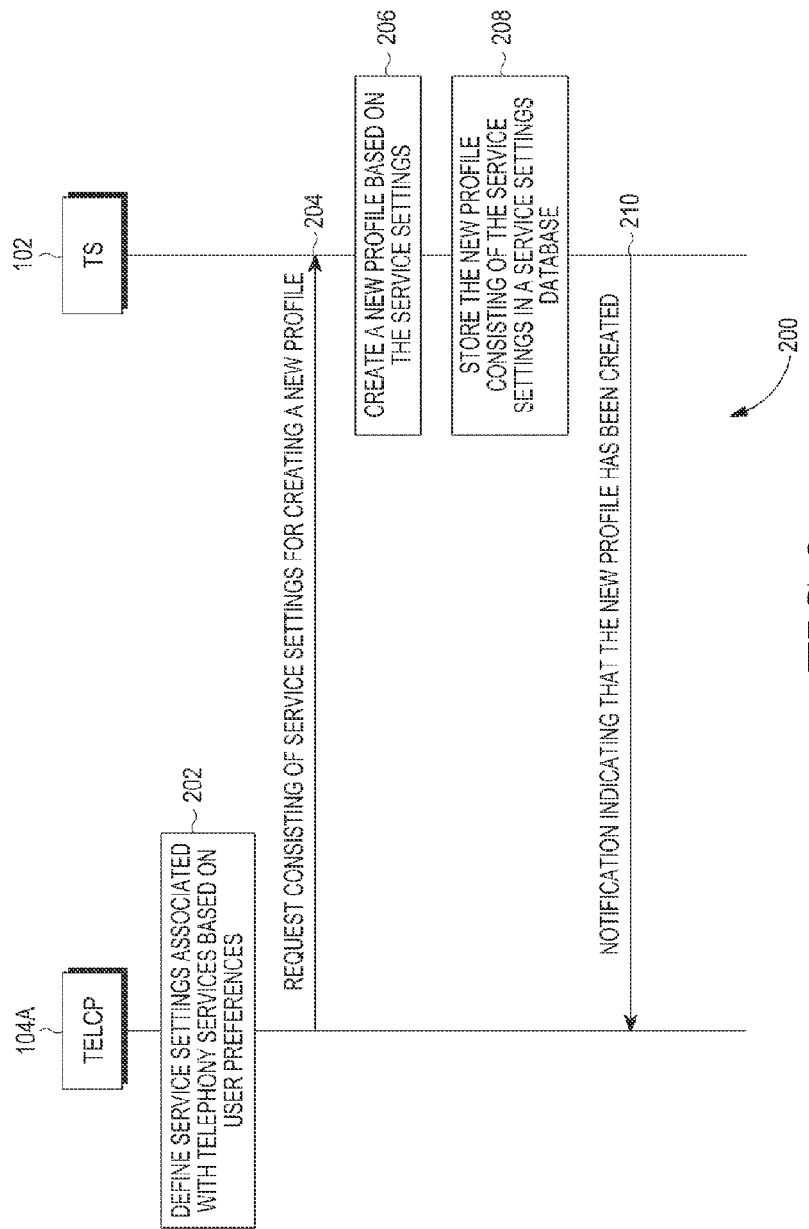
FIG. 2 is a flow diagram illustrating an exemplary method of creating and managing profile(s) containing service settings, according to one embodiment.

FIG. 2 is a flow diagram 200 illustrating an exemplary method of creating and managing profile(s) containing service settings, according to one embodiment. Referring to FIG. 2, at step 202, the TelCP 104A defines service settings associated with telephony services based on user preferences. At step 204, the TelCP 104A sends a request containing the service settings for creating a new profile to the TS 102.

At step 206, the TS 102 creates a new profile based on the service settings indicated in the request. At step 208, the TS 102 stores the profile containing the service settings in the service settings database 114. At step 210, the TS 102 notifies the TelCP 104A that the new profile has been successfully created. In this manner, a plurality of profiles having distinct service settings are created and stored in the service delivery setting database 114 using the above described process steps. Thus, the telephony user can select one of the plurality of profiles as active profile based on service settings desired.

Figure 3:
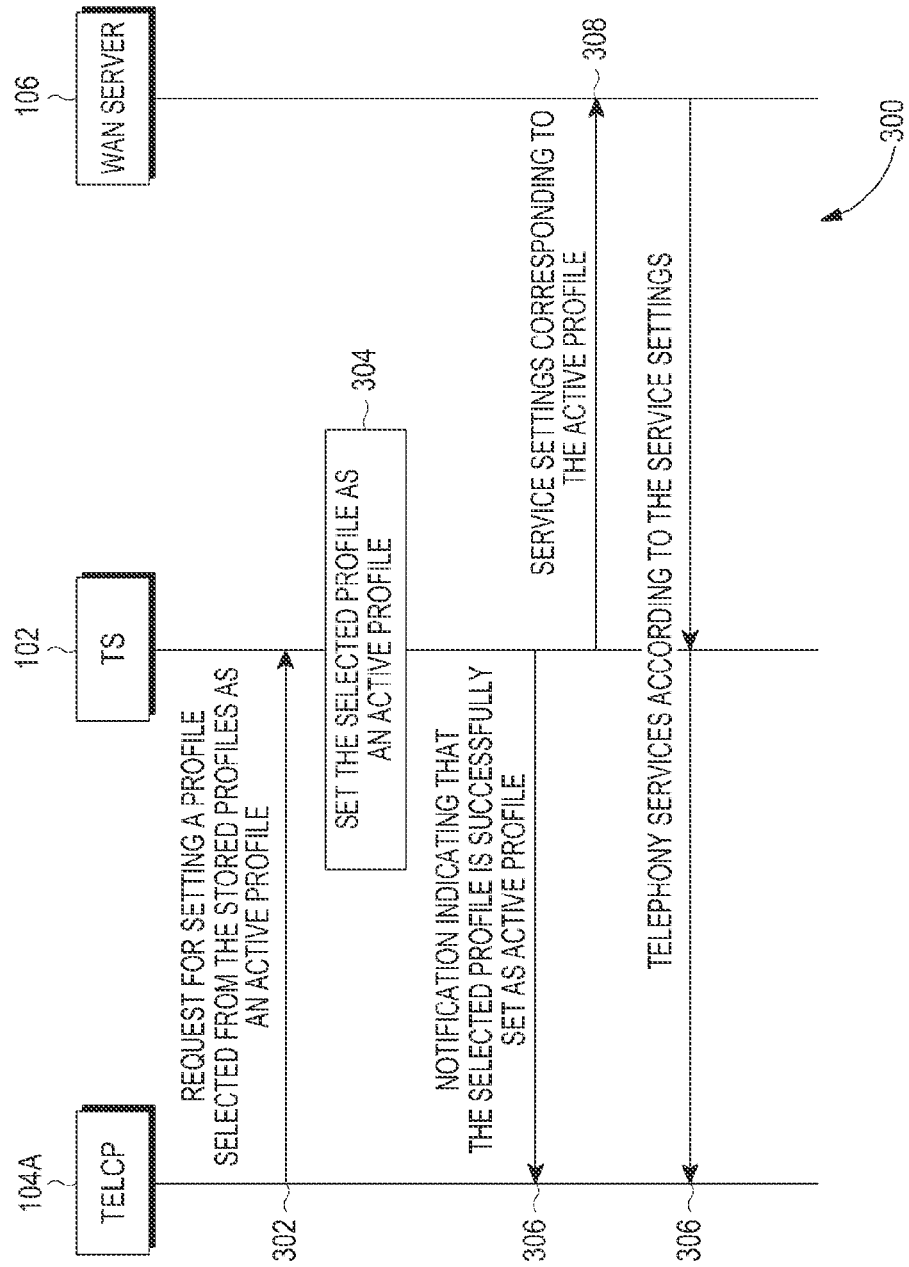
FIG. 3 is a flow diagram illustrating an exemplary method of delivering telephony services to a Telephony Control Point (TelCP) based on service settings corresponding to an active profile, according to one embodiment.

FIG. 3 is a flow diagram 300 illustrating an exemplary method of delivering telephony services to the TelCP 104A based on service settings corresponding to an active profile, according to one embodiment.

Referring to FIG. 3, at step 302, the TelCP 104A sends a request for setting selected profile from the stored profiles as active profile. At step 304, the TS 102 sets selected profile as active profile based on the request. At step 306, the TS 102 notifies the TelCP 104A that the selected profile is successfully set as active profile. At step 308, the TS 102 sends the service settings corresponding to the active profile to the WAN server 106. At step 310, the WAN server 106 delivers telephony service to the TelCP 104A via the TS 102 according to the service settings corresponding to the active profile.

Figure 4:
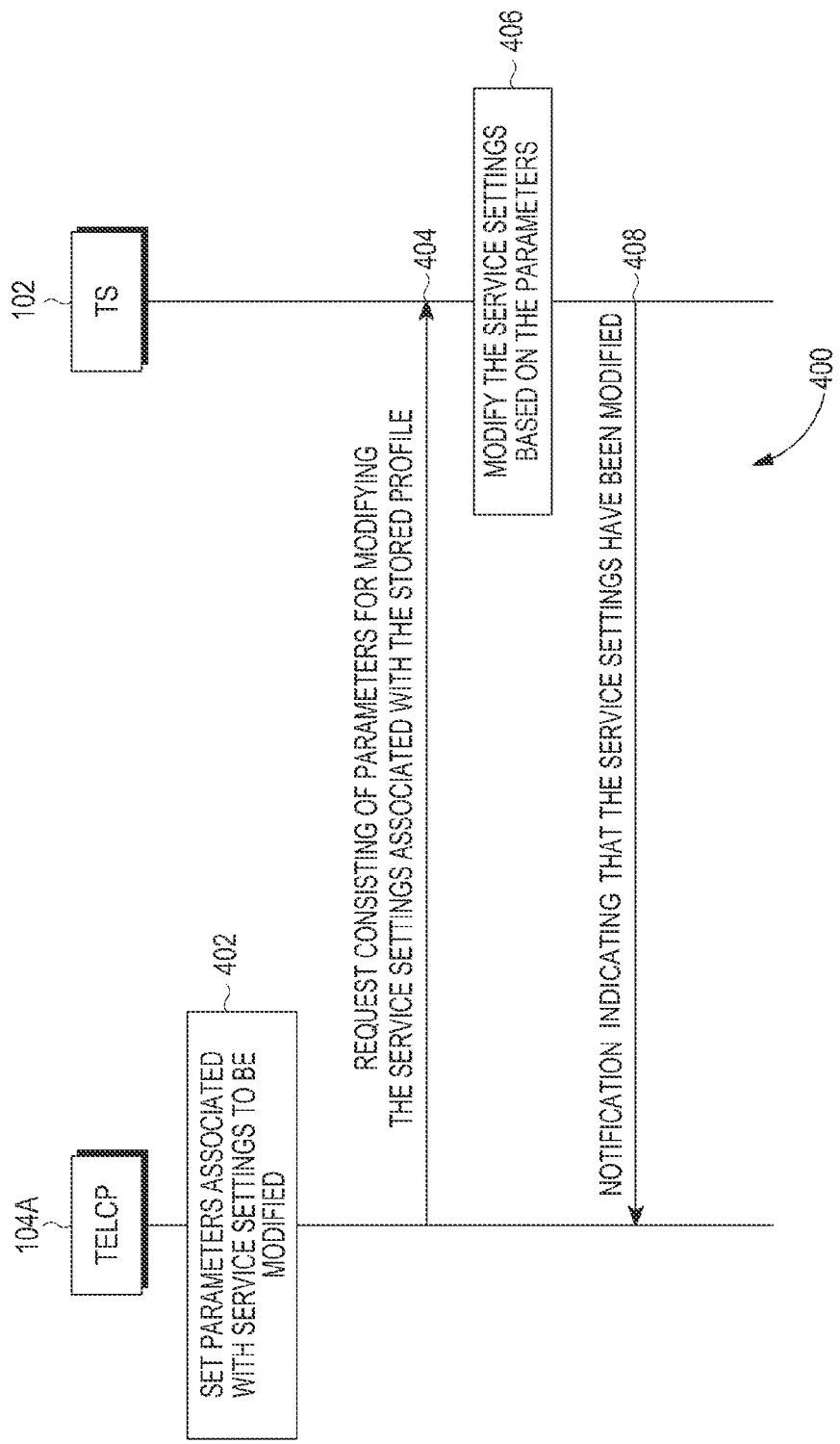
FIG. 4 is a flow diagram illustrating an exemplary method of modifying service settings associated with a profile, according to one embodiment.

FIG. 4 is a flow diagram 400 illustrating an exemplary method of modifying service settings corresponding to a profile, according to one embodiment.

Referring to FIG. 4, at step 402, the TelCP 104A sets parameters associated with service settings of the stored profile to be modified. At step 404, the TelCP 104A sends a request containing the parameters for modifying the service settings associated with the stored profile. At step 406, the TS 102 modifies the service settings associated with the stored profile based on the parameters. At step 408, the TS 102 notifies the TelCP 104A that the requested service settings corresponding to the stored profile has been successfully modified.

Figure 5:
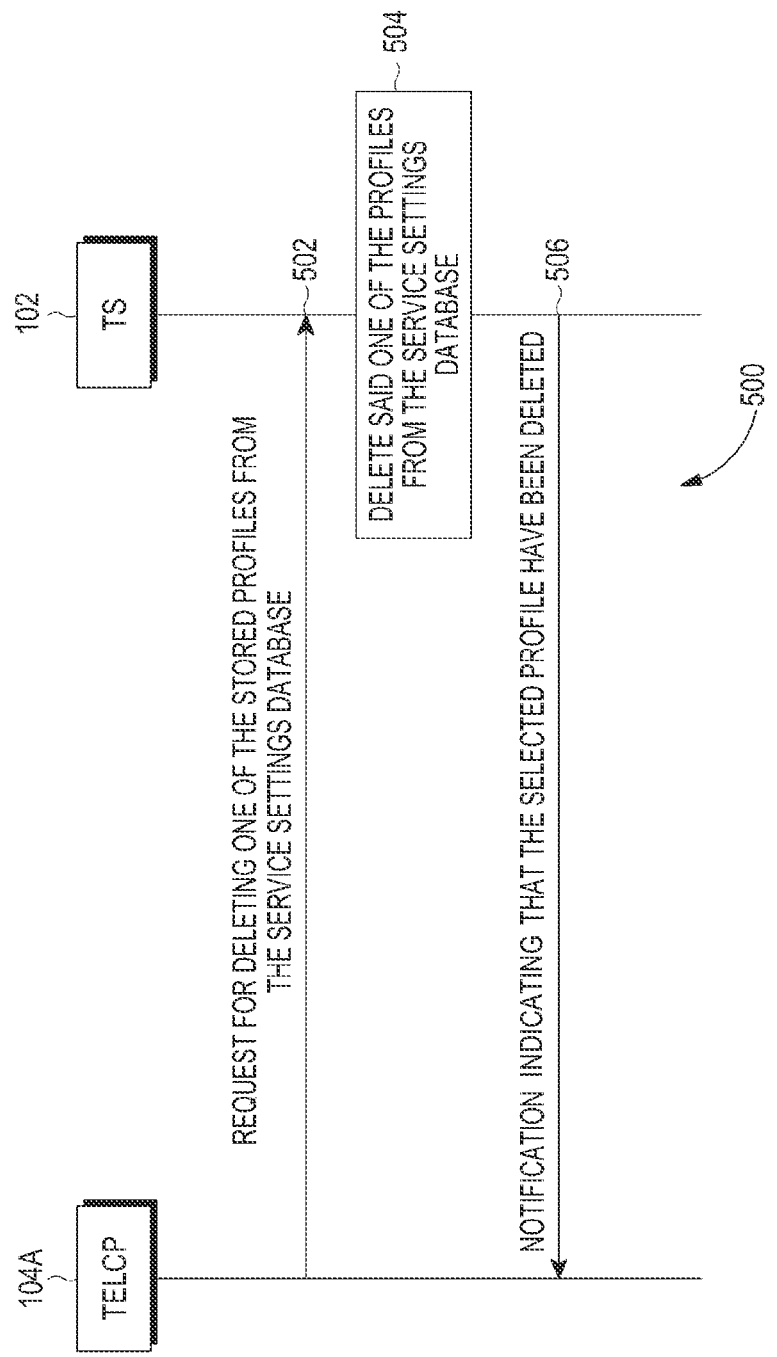
FIG. 5 is a flow diagram illustrating an exemplary method of deleting one of the profiles stored in a service settings database, according to one embodiment.

FIG. 5 is a flow diagram 500 illustrating an exemplary method of deleting one of the profiles stored in the service settings database 114, according to one embodiment.

Referring to FIG. 5, at step 502, the TelCP 104A sends a request for deleting one of the stored profiles from the service settings database 114. For example, the request indicates the name of the profile to be deleted. At step 504, the TS 102 deletes said one of the stored profiles from the service settings database 114. At step 506, the TS 102 notifies the TelCP 104A that the selected profile is successfully deleted from the service settings database 114.

Figure 6:
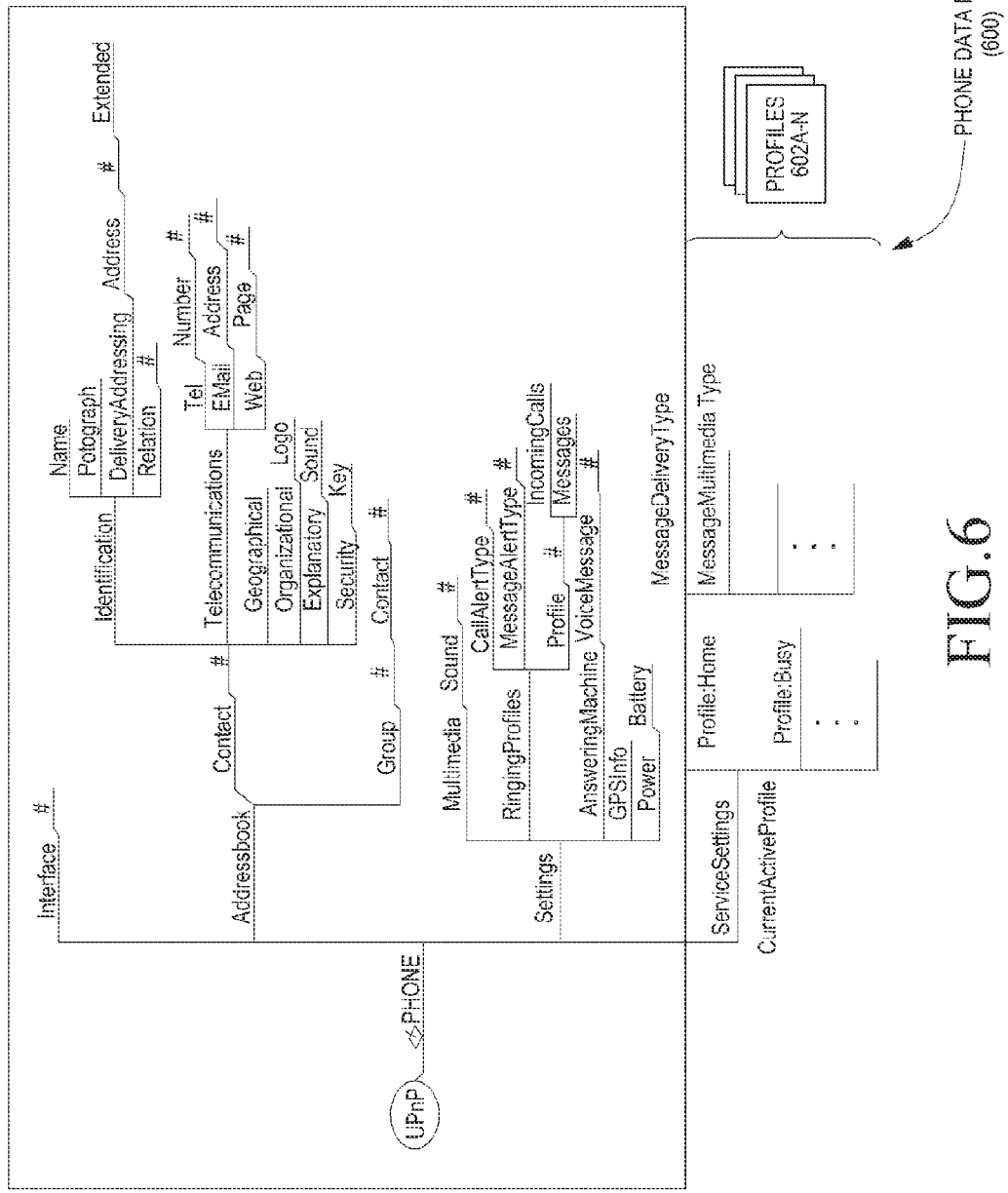
FIG. 6 is a schematic representation of a phone data model storing a plurality of profiles consisting of service settings, according to one embodiment.

FIG. 6 is a schematic representation of a phone data model 600 storing a plurality of profiles consisting of service settings, according to one embodiment. In one exemplary implementation, referring to FIG. 6, the service settings are stored in the Phone Data Model 600 defined by UPnP Telephony standard. For this, existing Phone Data Model is extended to include the service settings. The service settings are a set of service related settings which control the service behavior on WAN side (e.g., service provider side). The two main services include messaging service and call service.

According to the present invention, profiles 602A-N consisting of service settings are stored in the phone data model 600. It can be seen from the phone data model 600 that, a new element 'Service Settings' 604 is added to the phone data model 600 for managing the profiles 602A-N. Also, a new attribute called 'current active profile' 606 is added to the 'Service Settings' to set one of the profiles 602A-N as active profile.

As discussed earlier, the present invention enables a telephony user to manage the service settings as a profile which in turn allows easy management of the service settings easily. A telephony user can associate a unique profile name for a set of service settings. In an exemplary implementation, the TelCP 104A can use CMS service to set service settings in the phone data model 600. For example, GetValues( ) and SetValues( ) CMS actions can be used to manage these settings.

Figure 7:
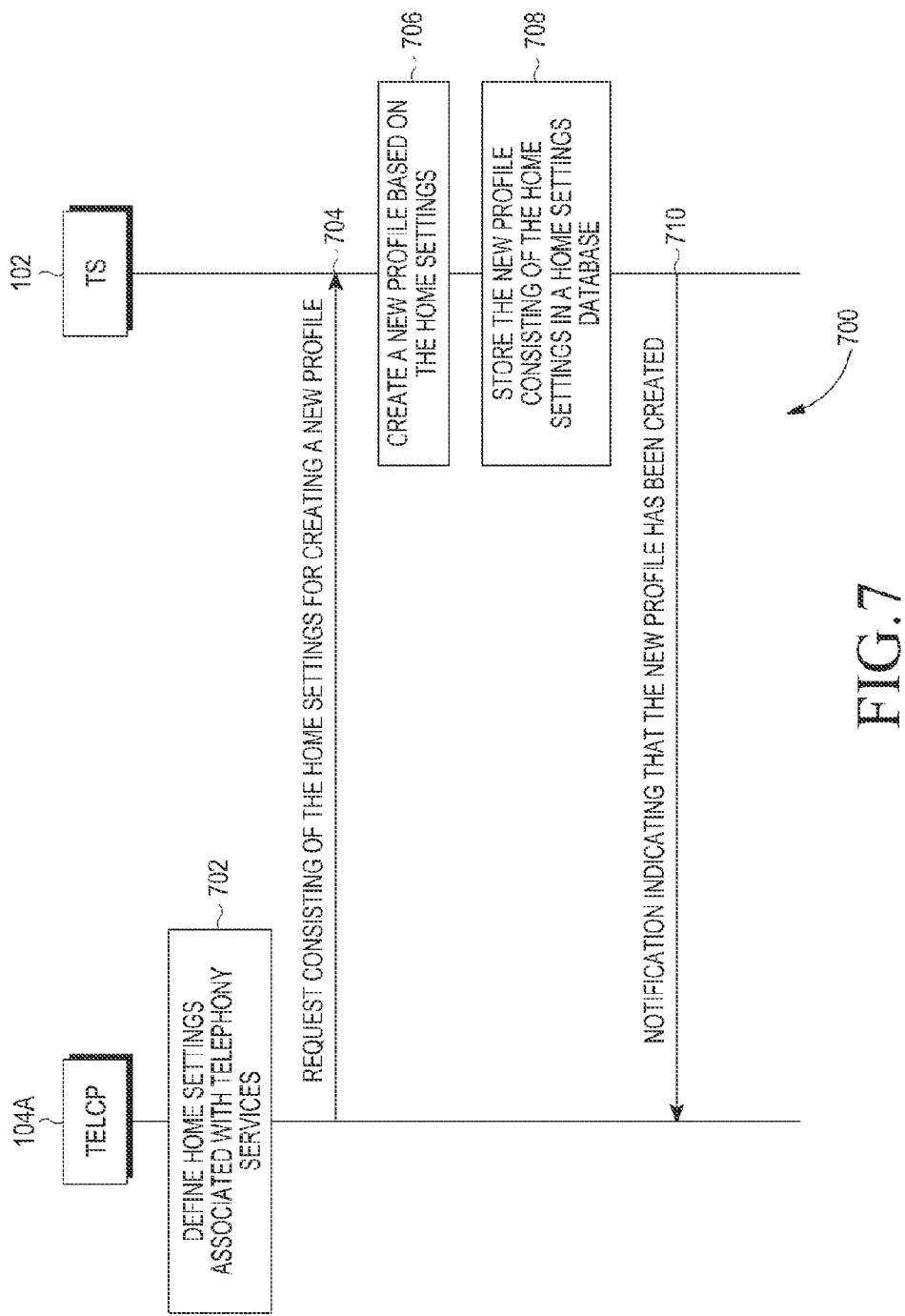
FIG. 7 is a flow diagram illustrating an exemplary method of creating and managing profile(s) containing home settings related to telephony services inside home, according to one embodiment.

FIG. 7 is a flow diagram 700 illustrating an exemplary method of creating and managing profile(s) containing home settings related to telephony services inside home, according to one embodiment.

Referring to FIG. 7, at step 702, the TelCP 104A defines home settings associated with telephony services. At step 704, the TelCP 104A sends a request containing the home settings for creating a new profile to the TS 102.

At step 706, the TS 102 creates the new profile based on the home settings indicated in the request. At step 708, the TS 102 stores the new profile containing the home settings in the home settings database 116. At step 710, the TS 102 notifies the TelCP 104A that the new profile has been successfully created. In this manner, a plurality of profiles having distinct home settings are created and stored in the home settings database 116 using the above described process steps. Thus, the telephony user can select one of the plurality of profiles as active profile based on the home settings desired.

Figure 8:
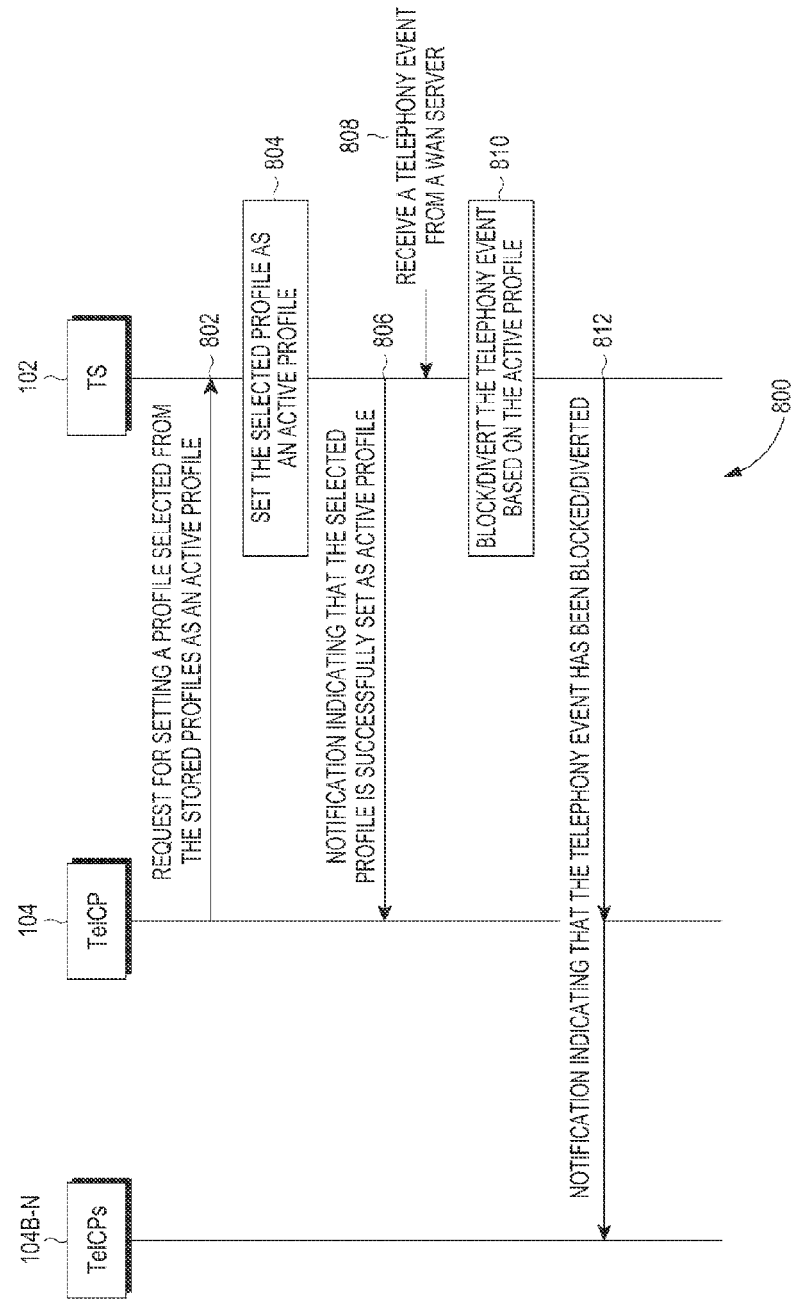
FIG. 8 is a flow diagram illustrating an exemplary method of delivering telephony services to TelCPs based on home settings corresponding to an active profile, according to one embodiment.

FIG. 8 is a flow diagram 800 illustrating an exemplary method of delivering telephony services to the TelCPs 104A-N based on the home settings corresponding to an active profile, according to one embodiment.

Referring to FIG. 8, at step 802, the TelCP 104A sends a request for setting a selected profile from the stored profiles as active profile. At step 804, the TS 102 sets selected profile as active profile based on the request. At step 806, the TS 102 notifies the TelCP 104A that the selected profile is successfully set as active profile. At step 808, the TS 102 receives a telephony event from the WAN server 106. At step 810, the TS 102 blocks/diverts the telephony event to the TelCP 104A based on the home settings associated with the active profile. At step 812, the TS 102 notifies the TelCPs 104B-N that the telephony event has been blocked/diverted.

Figure 9:
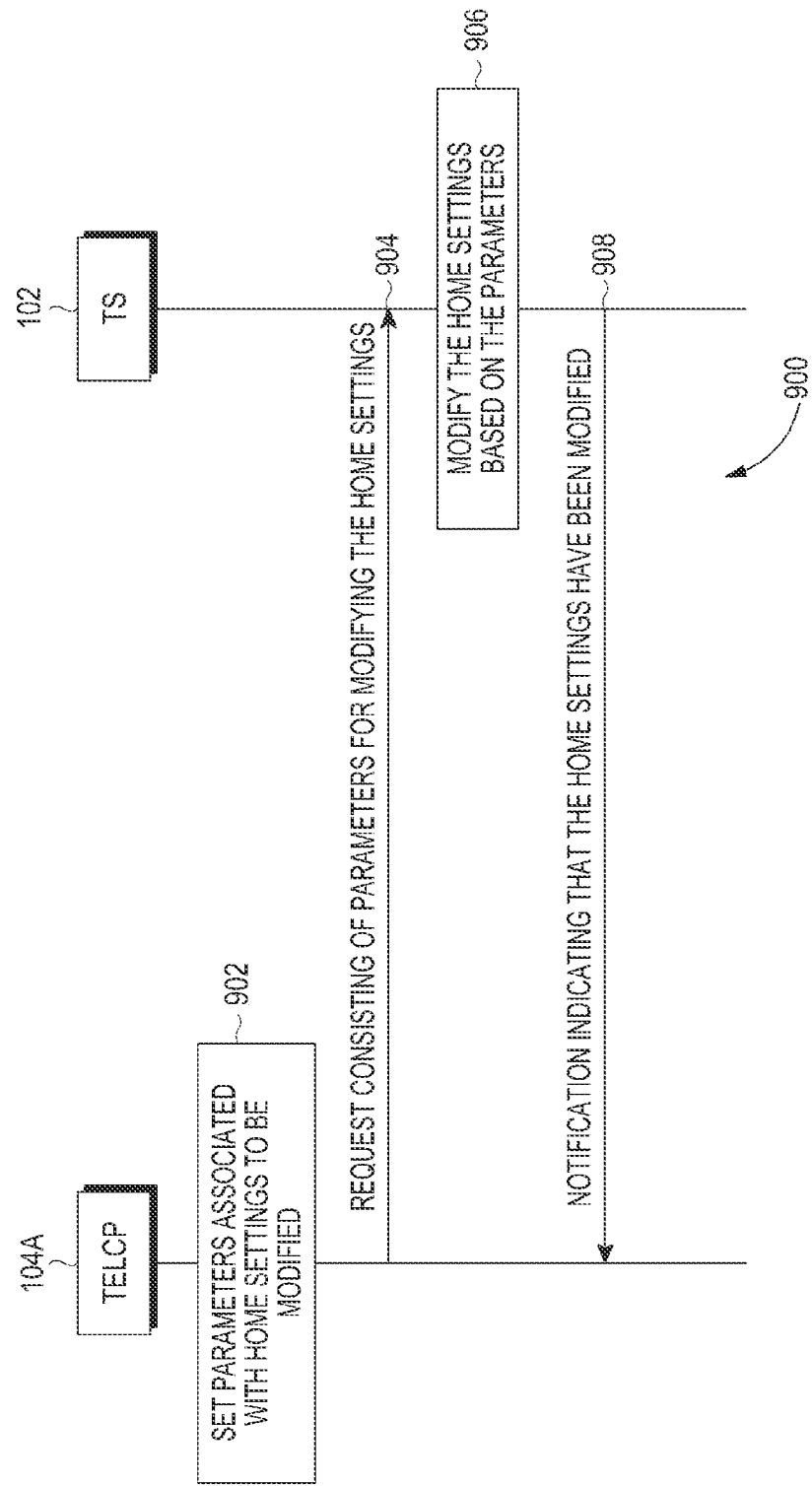
FIG. 9 is a flow diagram illustrating an exemplary method of modifying home settings corresponding to a stored profile, according to one embodiment.

FIG. 9 is a flow diagram 900 illustrating an exemplary method of modifying home settings corresponding to the stored profile, according to one embodiment.

referring to FIG. 9, at step 902, the TelCP 104A sets parameters associated with home settings of the stored profile to be modified. At step 904, the TelCP 104A sends a request containing the parameters for modifying the home settings associated with the stored profile. At step 906, the TS 102 modifies the home settings associated with the stored profile based on the parameters. At step 908, the TS 102 notifies the TelCP 104A that the requested set of parameters corresponding to the stored profile has been successfully modified.

Figure 10:
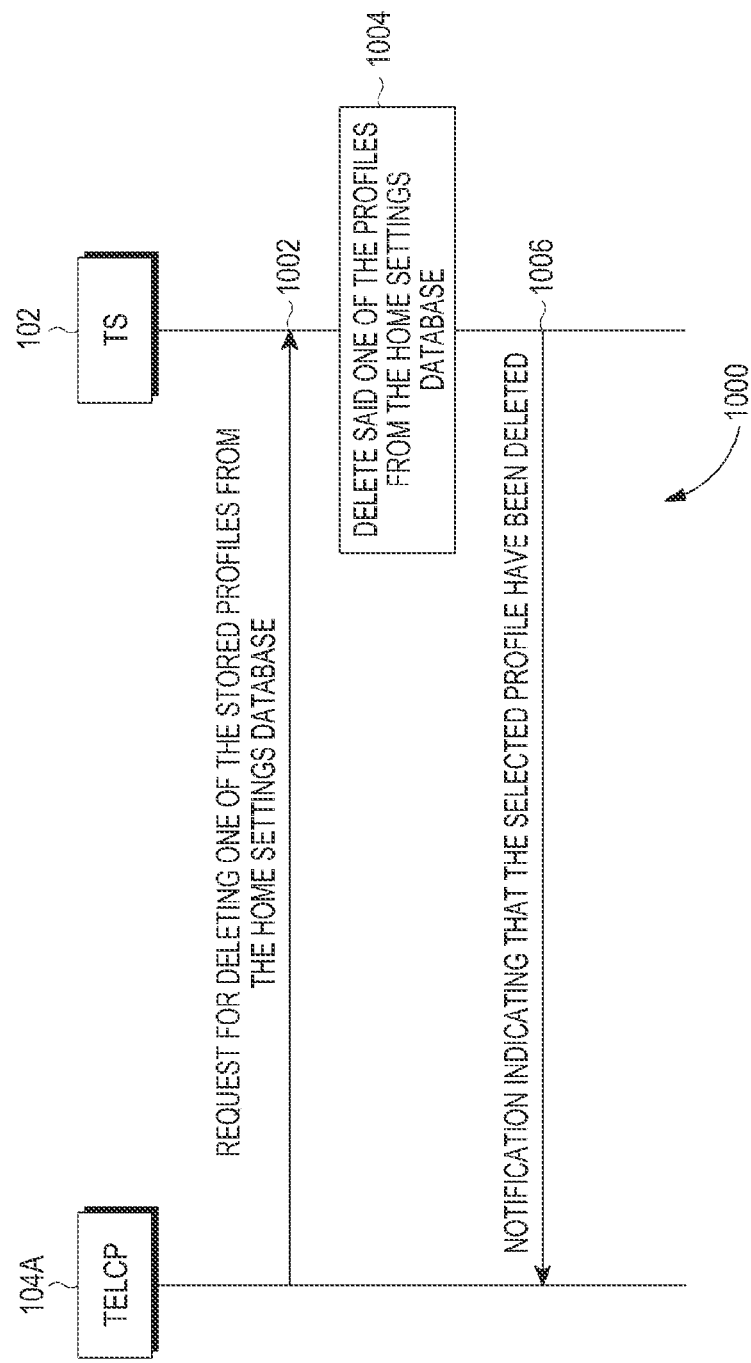
FIG. 10 is a flow diagram illustrating an exemplary method of deleting one of profiles stored in a home settings database, according to one embodiment.

FIG. 10 is a flow diagram 1000 illustrating an exemplary method of deleting one of the profiles stored in the home settings database 116, according to one embodiment.

Referring to FIG. 10, at step 1002, the TelCP 104A sends a request for deleting one of the stored profiles from the home settings database 116. For example, the request indicates the name of the profile to be deleted. At step 1004, the TS 102 deletes said one of the stored profiles from the home settings database 116. At step 1006, the TS 102 notifies the TelCP 104A that the selected profile is successfully deleted from the home settings database 116.

Figure 11:
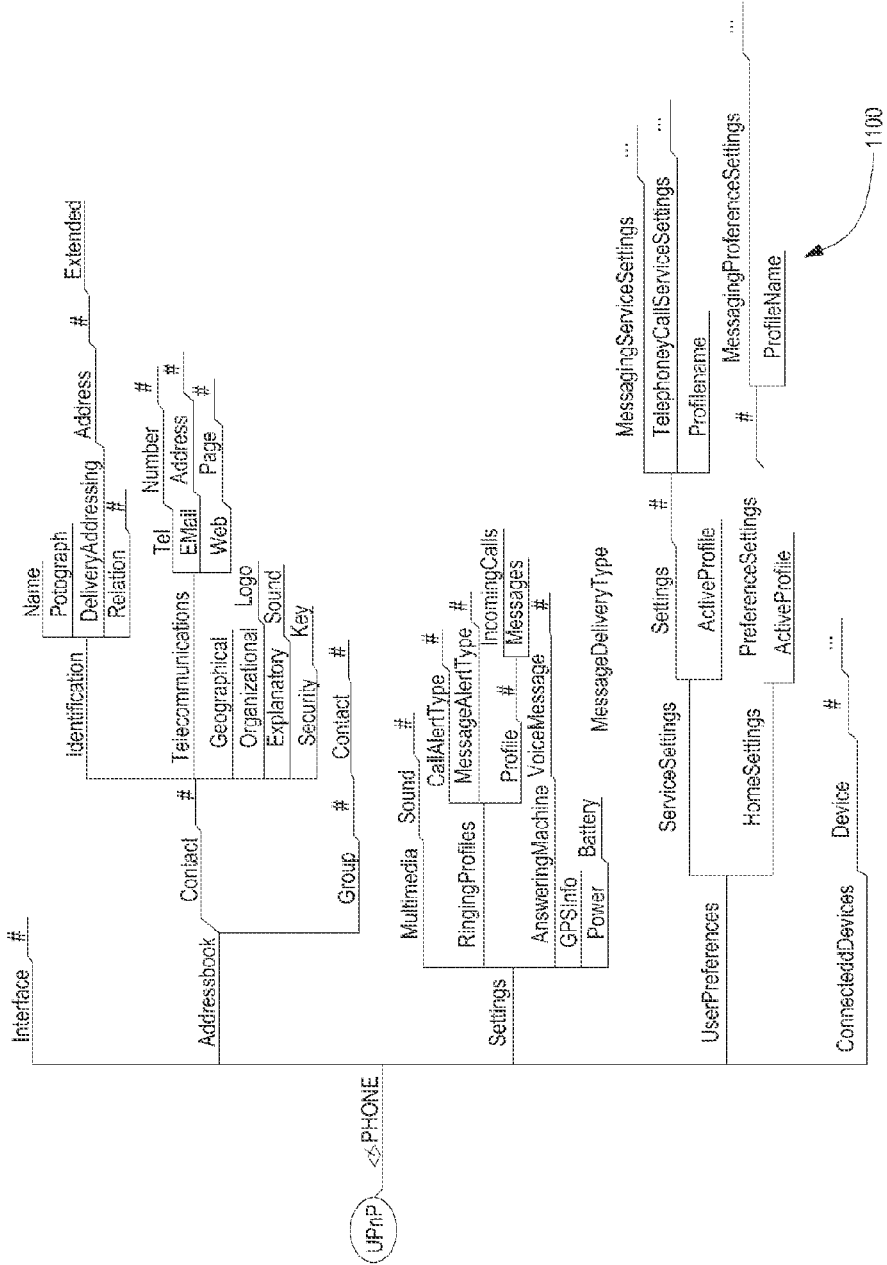
FIG. 11 is a schematic representation of an exemplary phone data model storing a plurality of profiles consisting of different home settings, according to one embodiment.

FIG. 11 is a schematic representation of an exemplary phone data model 1100 storing a plurality of profiles consisting of different home settings, according to one embodiment.

Referring to FIG. 11, profiles consisting of distinct home settings are stored in the phone data model 1100. It can be seen from the phone data model 1100 that, a new element 'Home Settings' is added to the phone data model 1100 for managing the profiles. Also, a new attribute called 'current active profile' is added to the 'Home Settings' to set one of the profiles as active profile.

In order to manage the service experience provided by the UPnP Telephony, the phone data model provides a set of user preferences (also referred to as home settings). These are the set of preferences for home settings which are related to UPnP Telephony services and are applicable to a home network. These settings are grouped into two service categories viz. messaging service and call management service. As discussed earlier, these home preferences are also grouped into a profile to provide an ease in managing the UPnP Telephony service settings. The GetValues( ) and SetValues( ) CMS actions can be used to manage a set of home settings stored in the phone data model 1100. Exemplary home settings stored in the phone data model are given in Appendix 'A'.

Figure 12:
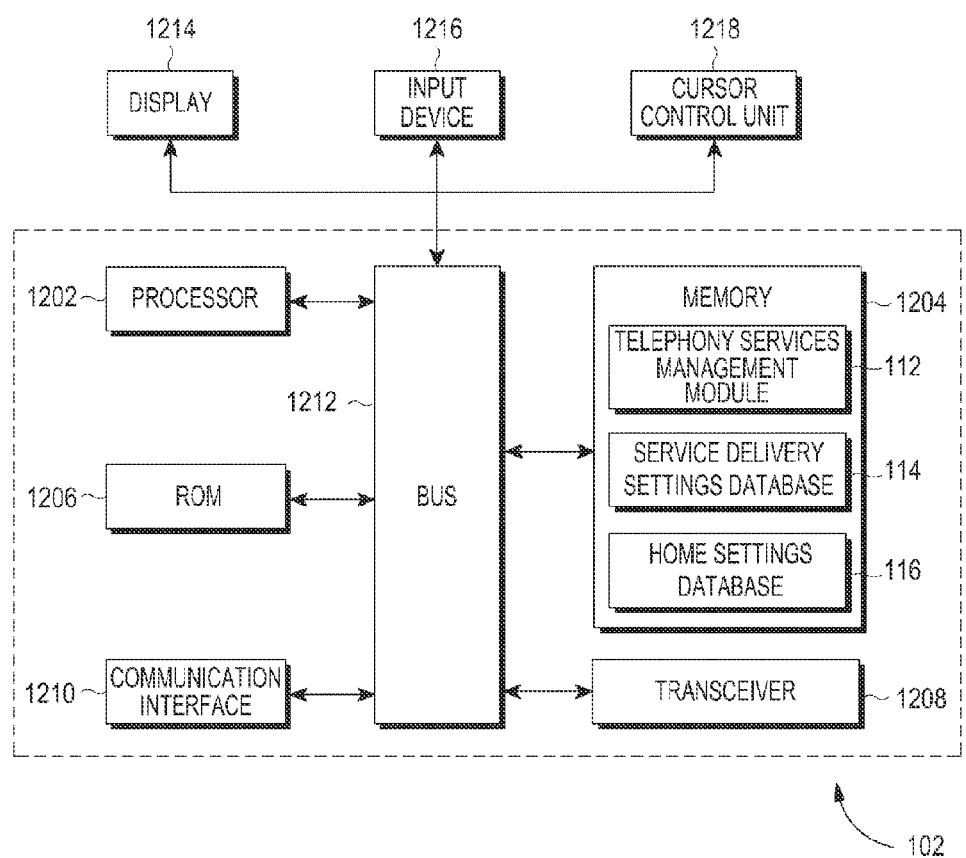
FIG. 12 illustrates a block diagram of an exemplary Telephony Server (TS) showing various components for implementing embodiments of the present subject matter.

FIG. 12 illustrates a block diagram of the TS 102 showing various components for implementing embodiments of the present subject matter. In FIG. 12, the TS 102 includes a processor 1202, memory 1204, a read only memory (ROM) 1206, a transceiver 1208, a bus 1210, a communication interface 1212, a display 1214, an input device 1216, and a cursor control 1218.

The processor 1202, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 1202 may also include embedded controllers, such as generic or programmable logic devices or arrays, application specific integrated circuits, single-chip computers, smart cards, and the like.

The memory 1204 may be volatile memory and non-volatile memory. The memory 1204 includes the telephony services management module 112, the service delivery setting database 114, and the home settings database 116, according to the embodiments of the present subject matter. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling memory cards, Memory Sticks™, and the like.

Embodiments of the present subject matter may be implemented in conjunction with modules, including functions, procedures, data structures, and application programs, for performing tasks, or defining abstract data types or low-level hardware contexts. The telephony services management module 112 is stored in the form of machine-readable instructions on any of the above-mentioned storage media and is executed by the processor 1202. In one embodiment, the computer program may be included on a storage medium and loaded from the storage medium to a hard drive in the non-volatile memory.

The components such as the transceiver 1208, communication interfaces, e.g. BUS 1212, the display 1214, the input device 1216, and the cursor control unit 1218 are well known to the person skilled in the art and hence the explanation is thereof omitted.

The present embodiments have been described with reference to specific example embodiments, it will be evident that various modifications and changes may be made to these embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

APPENDIX 'A'

TABLE 1

| Settings Name | Type | Description and usage |
|---|---|---|
| /UPnP/PHONE/ UserPreferences/ | SingleInstance | Stores user preference settings for the WAN side telephony services settings and UPnP Telephony related service (e.g., Messaging and CallManagement) settings. |
| /UPnP/PHONE/ UserPreferences/ ServiceSettings/ | SingleInstance | Stores user preference settings for the WAN side telephony services. |
| ActiveProfile | String | Stores current active profile name to be applied for the WAN side telephony services. e.g., "Home" or "Busy". |
| /UPnP/PHONE/ UserPreferences/ ServiceSettings/ Settings/#/ | MultiInstance | Store actual settings applicable for the WAN side messaging and call services. |
| ProfileName | String | Stores the profile name for the particular settings. For e.g. "Busy". |
| /UPnP/PHONE/ UserPreferences/ ServiceSettings/ Settings/#/ Messaging ServiceSettings/ | SingleInstance | Stores WAN side messaging settings. The implementation SHOULD implement at least this object or the CallServiceSettings object. |
| NetworkStorage | boolean | Enable/disable network storage for the messaging services. |
| DeferDelivery | boolean | Incoming message handling related settings. When message notification is received by the Telephony server from the WAN Side, the message can be either deferred or retrieved immediately. This setting controls the behavior of the Telephony Server. When this element is set to true then message will be deferred else it will be immediately retrieved by the TS. |
| SyncNetworkStorage | boolean | Sync local messages with network storage (especially for the messages like MMS and Email). |

TABLE 2

| MessageMediaTypes | String | This identifies allowed types of the message to received or sent. Allowed values, as a subset from the IANA registered formats http://www.iana.org/assignments/media-types/, are: text/plain (http://www.iana.org/assignments/media-types/text/). all audio/... media types (http://www.iana.org/assignments/media-types/audio/). |
|---|---|---|
| ConversationHistory | boolean | Enable/Disable conversation history storage for e.g. storing all the chat sessions. |
| DisableServiceFeatures | String | Comma separated feature list to be disable for the messaging service. The allowed values for the features are as follows, File Transfer Group Chat MMS SMS Email Chat Implementation can add more service specific features. For example, "FileTransfer, GroupChat" will disable the corresponding features. |

TABLE 3

| EnhancedOutgoingSession | String | This setting indicates additional information to be included in the outgoing chat sessions or message. The following are the allowed values for the additional information: Image: to include image into the outgoing chat session or message. location: to include the location information. Implementation can add more service specific elements. This element can carry multiple values separated by comma e.g., "image, location". The empty string (" ") will disable any kind of additional information from the outgoing message. |
|---|---|---|
| /UPnP/PHONE/ UserPreferences/ ServiceSettings/Settings/#/ MessagingServiceSettings/ AutoReply | SingleInstance | Small Auto reply feature for messaging services like email or SMS. |
| Status | boolean | Enable/Disable the auto reply message. |

TABLE 3-continued

| | | |
|---|---|---|
| ServiceType | String | This represents the service name in which the auto reply is applicable, The allowed values for the services are: SMS Email Implementation can add more service specific elements. This element can carry multiple values separated by comma e.g., "SMS, Email". |
| MessageText | String | Text message to be set as a auto reply. |
| /UPnP/PHONE/UserPreferences/ServiceSettings/Settings/#/MessagingServiceSettings/Report | SingleInstance | Enable disable the delivery and read report for the messages. |
| DeliveryReport | boolean | Enable/disable the delivery report for incoming messages. |

TABLE 4

| | | |
|---|---|---|
| ReadReport | boolean | Enable/disable the read report for incoming messages. |
| /UPnP/PHONE/UserPreferences/ServiceSettings/Settings/#/CallServiceSettings/ | SingleInstance | Stores service settings for telephony call service. The implementation SHOULD implement at least this object or the MessagingServiceSettings object |
| MediaCapabilities | String | This parameter represents the allowed media to be used for the telephony call service. The allowed values for the media are: Audio Video Implementation can add more service specific elements. This element can carry multiple values separated by comma e.g., "Audio, Video". |
| CallDivert | Boolean | Enable/Disable the incoming call diverting. |
| /UPnP/PHONE/UserPreferences/ | SingleInstance | Stores user preference settings for the UPnP Telephony |

TABLE 4-continued

| | | |
|---|---|---|
| HomeSettings/ | | related services settings. |
| ActiveProfile | String | Stores current active profile name to be applied for the UPnP Telephony service settings e.g., "Evening" or "Busy". |
| /UPnP/PHONE/UserPreferences/HomeSettings/PreferenceSettings/#/ | MultiInstance | Store actual settings for the UPnP Telephony service settings. |
| ProfileName | String | Stores the profile name for the particular settings. For e.g. "Busy". |
| /UPnP/PHONE/UserPreferences/HomeSettings/PreferenceSettings/#/Messaging PreferenceSettings/ | SingleInstance | Stores Telephony setting related to the UPnP Messaging service. If the TS implements the Messaging Service then this object should be implemented. |

TABLE 5

| | | |
|---|---|---|
| MessageNotificationFields | String | Comma separated message structure elements to be included in the NewMessage event notification of the Messaging service. E.g., "from, subject, priority" Elements refer to the Message structure in the Messaging service. |
| DisabledMessageClasses | String | Comma separated message classes which are disabled in the UPnP Messaging service. E.g., "SMS, EMAIL, MMS, Chat". Elements refer to the Message Class in the Messaging service. The TelCP(s) cannot send or receive the disabled message class. |
| /UPnP/PHONE/UserPreferences/HomeSettings/PreferenceSettings/#/CallManagementPreferenceSettings/ | SingleInstance | Stores Telephony setting related to the UPnP CallManagement service. |
| /UPnP/PHONE/UserPreferences/HomeSettings/PreferenceSettings/#/CallManagementPreferenceSettings/AnsweringMessage/ | SingleInstance | Stores the answering message related settings for the UPnP CallManagement service |
| /UPnP/PHONE/UserPreferences/ | MultiInstance | Represents the answering message. |

TABLE 5-continued

| | | |
|---|---|---|
| HomeSettings/PreferenceSettings/#/CallManagementPreferenceSettings/Message/#/ | | If both URI and CDSobject are not present or if the values are set as the empty string (" "), then the CallManagement service may use local message. |
| URI | uri | This element represents the URI of the recorded message. |
| CDSobject | String | This element represents the message stored in a UPnP ContentDelivery Service.The format is "UUID, serviceId, ObjectID". |

TABLE 6

| | | |
|---|---|---|
| Caller | String | This element represents the contact of the caller. The allowed values for this element is as follows:URI (e.g., Tel URI, SIP URI etc).InstanceID, this is the instance id of the/UPnP/PHONE/AddressBook/Contact/elementThe empty string ("") indicates this message is applicable to all the caller.This element may contain comma separated values of URIs and InstanceIds (e.g.,"Tel: +91981717171,12"). |

The invention claimed is:

1. A method for a first device in a home network comprising a plurality of devices, the method comprising:
 receiving, from a second device among the plurality of devices, an update request for at least one service setting among a plurality of service settings, which is stored in a database and is set based on a preference of user;
 updating, at the first device, the at least one service setting stored in the database in response to the request; and
 transmitting, to the second device, a notification indicating completion of the update of the at least one service setting,
 wherein the plurality of service settings comprises first service settings associated with at least one telephony service and second service settings to control a behavior of a service provided in a wireless area network, and
 wherein the service provided in the wireless area network comprises a second messaging service and a call service.

2. The method of claim 1, wherein the first service settings are applied in the home network, and the first service settings are grouped into two service categories comprising a first messaging service and a first call management service to be applied in the home network.

3. The method of claim 1, wherein a profile is used to manage each of the first service settings and the second service settings, and
 wherein an active profile is selected among at least one profile stored in the database in response to a request for setting the active profile from the second device.

4. The method of claim 1, further comprising:
 receiving, from the second device, a delete request for a service setting among the plurality of service settings stored in the database; and
 deleting the service setting in response to the delete request, and transmitting, to the second device, a notification indicating completion of deletion of the service setting.

5. The method of claim 1, wherein the first service settings comprise a first messaging service setting, a first call service setting, and a first profile name to manage the first service settings, and
 wherein the second service settings comprise a second message service setting and a second profile name to manage the second service settings.

6. The method of claim 1, wherein the database is stored in a phone data model.

7. A first device in a home network comprising a plurality of devices, the first devices comprising:
 a transceiver configured to receive, from a second device among the plurality of devices, an update request for at least one service setting among a plurality of service settings which is stored in a database and is set based on a preference of user; and
 a processor configured to update, at the first device, the at least one service setting stored in the database in response to the request, and control the transceiver to transmit, to the second device, a notification indicating completion of the update of the at least one service setting,
 wherein the plurality of service settings comprises first service settings associated with at least one telephony service and second service settings to control a behavior of a service provided in a wireless area network, and
 wherein the service provided in the wireless area network comprises a second messaging service and a call service.

8. The first device of claim 7, wherein the first service settings are applied in the home network, and the first service settings are grouped into two service categories comprising a first messaging service and a first call management service to be applied in the home network.

9. The first device of claim 7, wherein a profile is used to manage each of the first service settings and the second service settings, and
 wherein an active profile is selected among at least one profile stored in the database in response to a request for setting the active profile from the second device.

10. The first device of claim 7, wherein the transceiver is further configured to receive, from the second device, a delete request for a service setting among the plurality of service settings stored in the database, and
 wherein the processor is configured to delete the service setting in response to the delete request, and control the transceiver to transmit, to the second device, a notification indicating completion of deletion of the service setting.

11. The first device of claim 7, wherein the first service settings comprise a first messaging service setting, a first call service setting, and a first profile name to manage the first service setting, and wherein the second service settings comprise a message service setting, and a second profile name to manage the second service settings.

12. The first device of claim 7, wherein the database is stored in a phone data model.

13. A method for a first device in a home network comprising a plurality of devices, the method comprising:
receiving, from a second device among the plurality of devices, a request for generating a profile comprising at least one service setting among a plurality of service settings;
generating, at the first device, the profile comprising the at least one service setting in response to the request, and storing the profile in a database; and
transmitting, to the second device, a notification indicating the generation of the profile,
wherein the plurality of service settings comprises first service settings associated with at least one telephony service and second service settings to control a behavior of a service provided in a wireless area network, and
wherein the service provided in the wireless area network comprises a second messaging service and a call service.

14. The method of claim 13, wherein the database is stored in a phone data model.

15. A first device in a home network comprising a plurality of devices, the first device comprising:
a transceiver configured to receive, from a second device among the plurality of devices, a request for generating a profile comprising at least one service setting among a plurality of service settings; and
a processor configured to generate, at the first device, the profile comprising the at least one service setting in response to the request, control storage of the profile in a database, and control the transceiver to transmit, to the second device, a notification indicating the generation of the profile,
wherein the plurality of service settings comprises first service settings associated with at least one telephony service and second service settings to control a behavior of a service provided in a wireless area network, and
wherein the service provided in the wireless area network comprises a second messaging service and a call service.

16. The first device of claim 15, wherein the database is stored in a phone data model.

* * * * *